Jan. 11, 1938.   L. ROSEMAN   2,105,333
DUPLEX SEPARABLE FASTENER
Filed Feb. 28, 1936   2 Sheets-Sheet 1
Fig. 1
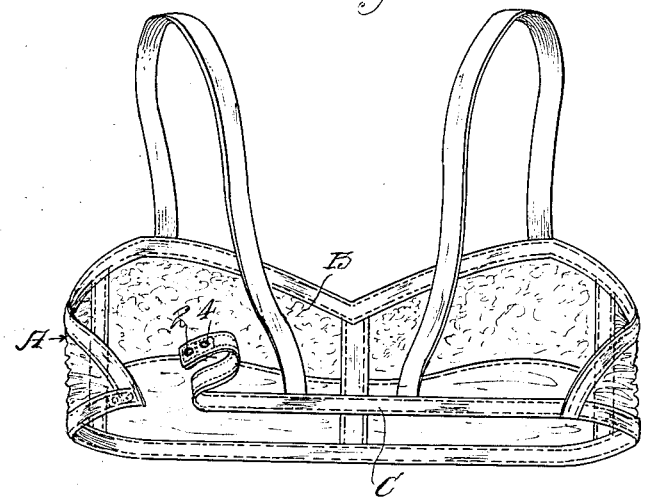
Fig. 2
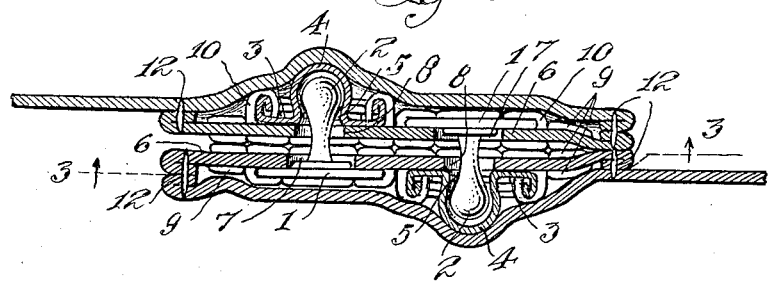
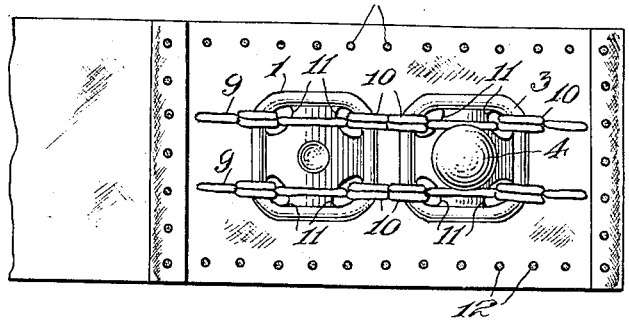
Fig. 3
INVENTOR
Leo Roseman,
BY
Harry B. Cook,
ATTORNEY

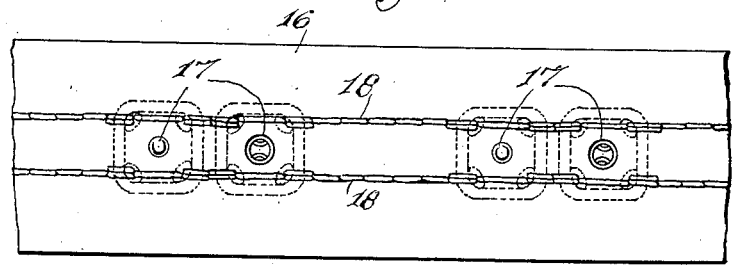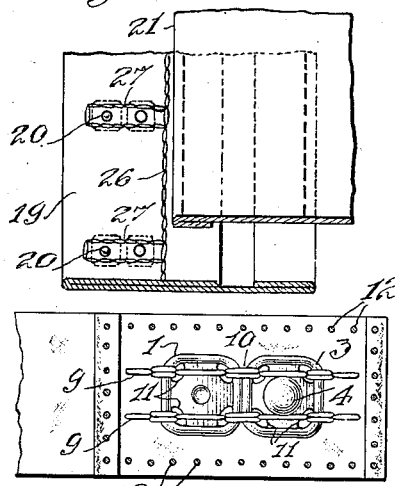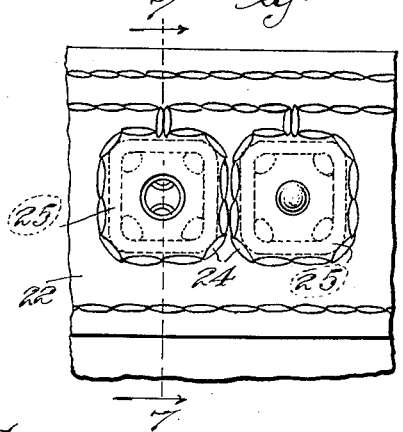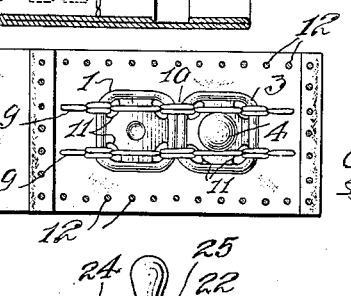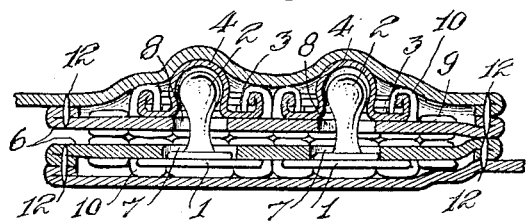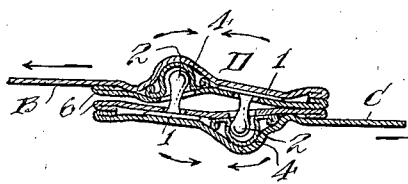

Patented Jan. 11, 1938

2,105,333

UNITED STATES PATENT OFFICE 2,105,333

DUPLEX SEPARABLE FASTENER

Leo Roseman, Newark, N. J.

Application February 28, 1936, Serial No. 66,190

3 Claims. (Cl. 24—203)

This invention relates in general to separable fasteners and particularly to separable fasteners of the type including two members one having a head or stud and the other having a socket or opening to separably receive the stud, for example fasteners generally known as "snap fasteners".

Such fasteners usually include a spring or springs in either the socket or the head to grip the head or the walls of the socket, respectively, so that the two members are frictionally held against separation; and in use each member is fixedly applied to one of two articles, or to one of two edges of a garment or article closure, for example a glove, dress, pocket book, etc., to cooperate in separably connecting together said articles or edges. However, the holding capacity or strength of such fasteners is practically limited by the strength of the spring or the degree of frictional contact between the head and socket; and therefore such fasteners cannot be used practically to withstand heavy strains or tension, for example to connect the edges of a tight-fitting garment such as a corset, brassière, girdle, bandeau, etc., because if the fastener members are made to have a frictional engagement sufficient to withstand such strains, it is extremely difficult, if not impossible for the user to connect and separate the fastener members. This objection to known fasteners of this character obtains when the strains are imposed upon the fasteners in either direction parallel or at angles to the axis of the heads and sockets. Therefore, it has been customary to use other types of separable fasteners where great strains are to be resisted, for example, hooks and eyes, buttons and button holes, or fasteners wherein the two members are connected or separated by relative sliding.

However, fasteners of the head and socket type are highly desirable because of the simplicity, inexpensiveness, compactness of construction and small size, simplicity and quickness of operation, pleasing appearance, flexibility of the edges of the garment to which they are applied, and the possibility of concealing or covering them. These advantages are especially desirable in garment fastener tape which includes two strips of fabric to be applied to the edges of garment closures, for example in corsets, brassières and the like, said strips having secured thereto complemental members of separable fasteners for connecting such edges together; because in such fastener tapes bulkiness of the fastener members, contact thereof with the body or other garments, difficult and complicated operation, conspicuousness of the fasteners and stiffness of the edges of the garment are highly objectionable.

The cooperating members of known fasteners of the head and socket type are particularly easily separable upon relative tilting of the members; and when such fasteners are used to connection two articles or the edges of an opening in a garment, the strains on such articles or edges in directions at angles to the axes of the heads and sockets cause much relative tilting of the fastener members, which, particularly, makes the use of known fasteners of the head and socket type impractical, if not impossible, where they will be subjected to heavy strains of this nature.

One object of my invention is to provide a novel and improved separable fastener tape of the head and socket type which shall have all of the above-mentioned advantages of known head and socket fastener tapes and wherein the fastener members shall be capable of resisting substantially greater strains in directions at angles to the axes of heads and sockets than can known fasteners of the head and socket type without accidental separation or disconnection of the fastener members under the influence of said strains.

A further object is to provide a novel and improved separable fastener of the character described comprising two cooperating sets of fastener elements, each of which has at least one head and one socket or two heads to cooperate with the other set which has a number of heads or sockets corresponding to those of the first-mentioned set, the fastener elements of each set being arranged and secured in a novel and improved manner, whereby the advantages of the head and socket type of fastener can be utilized in structures wherein the fasteners are subjected to great strains without danger of accidental disconnection of the fastener members while in use.

Another object is to provide a novel and improved fastener of the head and socket type which shall include a plurality of sets of separate fastener elements secured on each of the portions of an article or garment, each set on each portion comprising head elements and socket elements to cooperate with socket elements and head elements respectively of a set on the other portion, and the fastener elements of each set being secured to the respective portions so that the fastener elements of each set mutually restrain the tendency of each other to tilt under strains on said portions when in use in such a manner as to separate from their complemental fastener elements; and to provide such a fastener wherein the axes of the heads and sockets of each set are disposed and closely spaced in a common plane substantially parallel to the direction of such strains.

Other objects are to provide novel and improved fasteners including two strips of fabric having sets of complemental head and socket elements as above described sewed thereon, and wherein the axes of the heads and sockets of each set are disposed in a plane perpendicular to the longitudinal edges or median lines of the respective strips; to provide such a fastener wherein all of the fastener elements of a set can be connected to all fastener elements of a complemental set in one and the same operation by simple pressure between the thumb and index fingers to facilitate rapid connection of the fastener elements; and to obtain other advantages and results as will be brought out by the following description.

Referring to the accompanying drawings in which corresponding and like parts are designated throughout the several views by the same reference characters, Figure 1 is a perspective view of a brassière having a duplex separable fastener embodying my invention for connecting the ends of the bandeau.

Figure 2 is an enlarged vertical sectional view through the connected ends of the bandeau.

Figure 3 is a horizontal sectional view taken on the line 3—3 of Figure 2.

Figure 4 is a plan view of a piece of one form of fastener tape embodying my invention.

Figures 5 and 6 are similar views of two other forms of fastener tape.

Figure 7 is a transverse vertical sectional view on the line 7—7 of Figure 6.

Figure 8 is a schematic longitudinal sectional view through the fastener shown in Figures 1 and 2, illustrating how the fastener elements of each set mutually restrain tilting of the fastener elements, and Figure 9 is a view like Figure 2 showing another form of fastener embodying my invention.

Figure 10 is a sectional plan view similar to Figure 3 showing another modification of the invention.

Specifically describing the embodiment of the invention illustrated in Figures 1 to 3 inclusive, the reference character A designates a known type of bandeau including front portion B and a rear strap C the free end of which is separably connected to one end of the front portion by a separable fastener embodying the invention.

This fastener includes two complemental sets of fastener element, in the present instance of the head and socket type, each set comprising a head fastener element and a socket fastener element complemental to the socket and head fastener elements of the other set respectively. As shown, each head fastener element includes a base 1 and a head 2 at its face.

The socket fastener elements are of the usual construction including bases 3 and sockets 4 into which project springs 5 for frictionally engaging the heads of the complemental head elements. The base of the head fastener element of each set is sewed on one side of a strip of suitable material such as fabric 6 with its face abutting the strip and its head projecting through an aperture 7 in the strip. The socket element of each set is secured to the strip 6 of fabric with its face abutting the strip and its socket in register with an aperture 8 formed in the strip. The bases may be sewed on the strips 6 in any suitable manner, but preferably are secured by two continuous lines of stitches 9 which include tying stitches 10 which pass through apertures 11 in the bases of the fastener elements. The strips 6 are secured to the respective ends B and C of the braissière, by suitable stitching 12, with the bases of the fastener elements between the strips 6 and the material of the brassière.

The heads and socket of the fastener elements of each set are arranged on their respective strips closely spaced in the direction of the strains which are imposed on the ends B and C of the bandeau in substantially the planes of said ends when they are connected, with the axes of the heads and sockets of each set disposed in a common plane substantially parallel to the direction of such strains, and the bases of the adjacent fastener elements may overlap each other. The tying stitches 10 at the adjacent sides of the fastener elements of each set may pass between the fastener elements of the set as clearly shown on Figure 3, the bases of the fasteners being separated only by said stitches so as to approximately abut each other; or the same tying stitches 10a may overlie the adjacent edges of both of adjacent fasteners as shown in Figure 10.

The two sets of fastener elements are connected in the usual way by pressing the heads into the sockets, and it will be observed that because of the close proximity to each other of the fastener elements of a set, the fasteners of two complemental sets can be connected in one operation as by pressing between the thumb and index finger, whereby rapid connection of the fastener elements is facilitated. The fastener elements can be disconnected only with great difficulty by tension along the axes of the heads and sockets, but they can be easily disconnected by relatively tilting the complemental head elements and socket elements, as is usual with the known type of snap fasteners.

In use of known head and socket fasteners, strains imposed on the connected parts at angles to the axes of the heads and sockets cause such relative tilting of the fastener elements so that the fastener elements easily may become accidentally or unintentionally separated. However, with my invention, when the fastener is subjected to strains in planes parallel to the connected parts B and C, or at angles to the axes of the heads and sockets, the fastener elements of each set restrain the tendency of each other to tilt under such strains as shown in Figure 8, so that the possibility of accidental separation of the sets of fastener elements is reduced or overcome. More particularly, the small amount of fabric between the adjacent fastener elements of each set and the tying stitches 10, serve as hinges between the fastener elements, and the fastener elements of each set are spaced apart substantially exactly the same distance. Therefore, when the fastener is subjected to strains as aforesaid, the fastener element of each set nearest the source of tension will tend to tilt toward the direction of pull on the respective part B or C as indicated at D, so that the edge of said fastener element adjacent the adjoining fastener element of same set will exert a pull on the second-mentioned fastener element tending to tilt the latter in the oposite direction as indicated at E. At the same time the second-mentioned fastener element itself has a tendency under the strain to tilt in the same direction as the first-mentioned element, and this has the effect of restraining the tilting of the first-mentioned element. The net result is that all tilting of both fastener elements of the set is restrained or "snubbed". It should be understood that Figure 8 is schematic and illustrates only a "tendency", the degree of tilting of the fastener elements being exaggerated for the purpose of clear explanation.

With this construction it will be observed that the fastener of the invention has all of the advantages of the regular head and socket fasteners, and no special form of fastener element is necessary so that the cost of the fastener is no greater than the cost of the ordinary head and socket fastener; and at the same time the fastener of the invention is capable of resisting substantially greater strains in directions at angles to the axes of the heads and sockets than can known fasteners of the head and socket type without accidental separation or disconnection of the fastener elements.

Figure 4 shows a strip 16 of fabric to be secured along the edge of a garment opening and having a plurality of sets of fastener elements 17 longitudinally spaced and secured thereon by lines of stitches 18 like the stitching 5 to cooperate with complemental fastener elements of another similar strip on the other edge of the garment opening, the fasteners of each set being spaced longitudinally of the strip or in a direction at right angles to the direction of strains applied to the strips when the latter are secured to the edges of a garment opening. With this structure the fastener will resist strains several times greater than the known fasteners wherein the fastener elements are singly and distantly spaced along the strip.

This constitutes also a very convenient manner of making the complemental sets of fasteners as shown in Figures 1 to 3 inclusive; the strip may be cut into sections each including two or more sets of fastener elements.

In Figure 5 of the drawings I have shown the invention embodied in a fastener tape which includes a strip of fabric 19 having a plurality of complemental sets of fastener elements spaced longitudinally thereof and secured thereon by a continuous line of stitching which includes portions 26 extending longitudinally of the strip and transverse stitches 27 extending transversely of the strip and which pass through the apertures in the fastener elements. The tape 19 is intended to be secured to the edge portion 21 of a garment or other article, and the fastener elements of each set 20 are arranged in the same relation to each other as the fastener elements of the sets shown in Figures 1 to 3 inclusive, with the axes of the heads and sockets of each set disposed in a plane perpendicular to the longitudinal edges or median line of the strip 19. The fastener elements of each set are spaced apart in the direction of the strains imposed on the edge portion 21 of the garment or article when in use. It will be understood that there will be two complemental strips 19, each bearing fastener elements which are complemental to the fastener elements of the other strip.

It will be understood by those skilled in the art that each set of fastener elements may include two or more fastener elements, and each set may also include only head elements or only socket elements, as shown in Figure 9, to cooperate with socket and head elements respectively of a complemental set of fastener elements.

If desired, the fastener elements may be stitched between two plies 22 and 23 of fabric as shown in Figures 6 and 7.

Also, if desired, the fastener elements may be stitched to the fabric by annular lines of stitches 24 snugly embracing the peripheries of the bases 25 of the fastener elements as shown in Figure 6 of the drawings and in my copending application Serial No. 660,626, filed March 14, 1933.

Other methods of securing the fastener elements to the portions to be connected will readily occur to those skilled in the art. Other forms of fastener elements also may be used without departing from the spirit or scope of the invention, the essence of the invention being the use of complemental sets of head and socket fastener elements with the elements of each set so secured close together on the respective portion of the article or garment to be connected to another portion, that tendency to tilting of the fastener elements in such a manner as to accidentally disconnect the head and socket elements is restrained or prevented, which gives many times greater strength than the old type of fastener having single fastener elements distantly spaced on the article or garment.

Having thus described my invention, what I claim is:

1. In a fastener the combination with two parts of flexible material to be connected, of complemental sets of head and socket fastener elements, each set including a head element and a socket element complemental to fastener elements of the other set and secured on one of said parts in closely spaced relation to each other with the axes of their heads and sockets perpendicular to the planes of said parts, so that when tension is applied to said parts in their own planes while the fastener is in use, the flexibility of the material of said parts between the respective fastener elements permits relative movement of the fastener elements of each set to cause said elements mutually to restrain tilting of each other.

2. In a fastener, the combination of two parts of flexible material to be connected, complemental sets of head and socket fastener elements, each set including separate fastener elements complemental to fastener elements of the other set and arranged on one of said parts with the axes of their heads and sockets perpendicular to the planes of said parts, each fastener element having a base formed with apertures and with its edge abutting the edge of the base of the adjacent fastener element of the same set, and stitches passing through said apertures of both of said adjacent fastener elements and penetrating the respective said part to secure said fastener elements on said part, so that when tension is applied to said parts in their own planes while the fastener is in use the flexibility of the material of said parts between the respective fastener elements permits relative movement of the fastener elements of each set to cause said elements mutually to restrain tilting of each other.

3. In a fastener, the combination of two parts of flexible material to be connected, complemental sets of head and socket fastener elements, each set including separate fastener elements complemental to fastener elements of the other set and arranged on one of said parts with the axes of their heads and sockets perpendicular to the planes of said parts, each fastener element having a base formed with apertures and with its edge in close relation to the edge of the base of the adjacent fastener element of the same set, and stitches passing through said apertures, overlying the adjacent edges of said adjacent fastener elements and penetrating the respective said part to secure the fastener elements on said part, so that when tension is applied to said parts in their own planes while the fastener is in use the flexibility of the material of said parts between the respective fastener elements permits relative movement of the fastener elements of each set to cause said elements mutually to restrain tilting of each other.

LEO ROSEMAN.